United States Patent [19]
Sone

[11] 3,723,000
[45] Mar. 27, 1973

[54] AUTOMATIC EXPOSURE CONTROL FOR CONTACT EXPOSURE PHOTOCOPYING MACHINE

[75] Inventor: Hitoshi Sone, Kita Chigasaki, Japan

[73] Assignee: Kabushiki Kaisha Ricoh, Tokyo, Japan

[22] Filed: Aug. 10, 1970

[21] Appl. No.: 62,558

Related U.S. Application Data

[63] Continuation-in-part of Ser. No. 689,870, Dec. 12, 1967, abandoned.

[30] Foreign Application Priority Data

Dec. 15, 1966 Japan ....................41/82476

[52] U.S. Cl. ....................355/83, 355/68
[51] Int. Cl. ....................G03b 27/78
[58] Field of Search ....................355/83, 35, 38, 67, 68

[56] References Cited

UNITED STATES PATENTS 2,700,750 1/1955 Dickinson ....................324/99
3,472,592 10/1969 Nichols et al ....................355/83
3,519,347 7/1970 Bowker et al ....................355/83 X
3,413,065 11/1968 Funk ....................250/219 F

FOREIGN PATENTS OR APPLICATIONS 598,035 5/1960 England ....................355/83
1,522,790 10/1969 Germany ....................355/83

*Primary Examiner*—Samuel S. Matthews
*Assistant Examiner*—Richard L. Moses
*Attorney*—Burgess, Ryan & Hicks

[57] ABSTRACT

An automatic exposure control for a contact exposure type photocopying machine wherein the exposure time is controlled automatically in response to the light penetrating coefficient or transmittance of the original form. The light penetrating coefficient is electrically detected and automatically set in a digital counter with the counter contents being converted into an analog exposure control signal for utilization by an exposure-time control device in the machine. Upon completion of one complete exposure, the counter is automatically reset in preparation for receiving the next original and repeating the automatic control cycle.

7 Claims, 3 Drawing Figures

INVENTOR.
HITOSHI SONE
BY
Cushman, Darby & Cushman
ATTORNEYS

INVENTOR.
HITOSHI SONE
BY
Cushman, Darby & Cushman
ATTORNEYS

AUTOMATIC EXPOSURE CONTROL FOR CONTACT EXPOSURE PHOTOCOPYING MACHINE

This is a continuation-in-part of my earlier filed copending application Ser. No. 689,870 now abandoned filed Dec. 12, 1967.

This invention generally relates to a photocopying machine in which the photo-sensitive paper is exposed while in contact with the original form and more particularly relates to an automatic time exposure control for use with such a photocopying machine.

In general when the original form is passed in registration with a photo-sensitive paper through an exposure station, in such a machine, the photo-sensitive paper is exposed by light from a light source passing through the original. Therefore, the actual exposure of the photo-sensitive copy paper is determined by the transport speed at which the original form (in registration with the photo-sensitive paper) passes through the exposure station. More particularly, when the original and accompanying photo-sensitive paper is transported by a conveyor belt, the exposure time is dependent upon the speed of this belt.

The quantity of light transmitted through the original is dependent upon many of the physical characteristics of the original such as thickness, colors, tones, etc. so that in order to give a constant quantity of light exposure to the photo-sensitive paper (i.e. the optimum exposure) independently of the physical characteristics of the original, the speed of the belt or other exposure control means must be changed or controlled in response to variation in these physical characteristics.

In conventional photocopying machines, the speed of such a belt is manually set, usually by trial and error thus producing needless waste as well as being inconvenient. In many cases the optimum exposure is never actually discovered. Rather, an "acceptable" exposure is finally discovered and less than optimum quality copies are the result.

It is therefore an object of this invention to provide an automatic exposure control device for use with a contact exposure photocopying machine in which the speed of a belt or other exposure control means may be automatically controlled in response to the variation in quantity of light passing through any submitted original due to the variation in its physical characteristics thereby exposing a photo-sensitive paper with a constant quantity of light irrespective of the variation in physical characteristics of the original.

A further objective of this invention is to provide a control signal for controlling such exposure which is constantly maintained,once automatically set in response to the physical characteristics of an original, until the exposure of the photo-sensitive paper is completely accomplished for that particular original.

According to another aspect of this invention, means are provided for sensing when the exposure is completed, and then automatically releasing the controlled speed of the belt or other exposure control thus permitting the belt to be subsequently set to any suitable speed dependent upon the physical characteristics of the next submitted original.

Briefly, in this invention, a control signal voltage representative of the light penetrating coefficient of the original is generated by penetrating coefficient detecting means and is converted into a digital signal which is later fed into a digital counter, which, in turn, is set and temporarily maintained at a constant value representative of this control signal voltage. The output of the counter is then converted into an analog exposure voltage or signal by a digital-to-analog convertor. This converted analog voltage is subsequently used to control a motor which drives a belt transporting the original in registration with the photo-sensitive paper.

Consequently, the motor is driven at a particular speed which is best suited to obtain an optimum light exposure in view of the light penetrating coefficient of this particular original. In addition, this particular speed is automatically maintained until the exposure is completed and is then automatically returned to a normal speed when the exposure is completed by resetting the counter in response to the actuation of a switch by the original as it is leaving the machine. Motor speed is thus ready for resetting at another suitable speed in response to the light transmittance of the next original.

A more complete understanding of this invention may be obtained by carefully studying the following detailed description of an exemplary embodiment of this invention in conjunction with the accompanying drawings of which:

Figure 1:
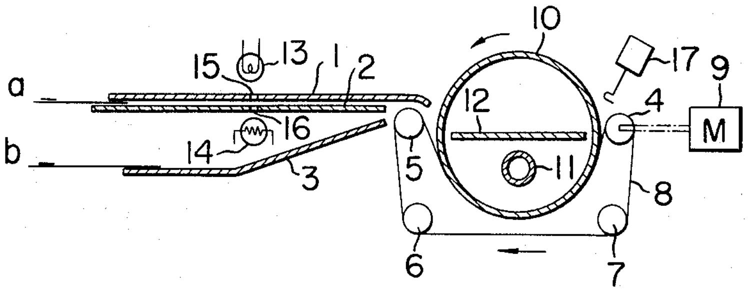
FIG. 1 is a diagrammatic sectional view of a contact exposure photocopying machine emobodying the present invention.

Referring to FIG. 1 an original *a* is guieded by guides 1 and 2 while a photo-sensitive paper *b* is guided by a guide 3. A light source or exciting lamp 13 is disposed above a slit 15 formed through the guide 1 while a photo-electric element 14 is disposed below a slit 16 formed through the guide 2 in opposed relation with the slit 15 in order to intercept the light rays from the exciting lamp 13.

A belt 8 is wrapped around a drive roller 4 which is driven by a motor 9 around guide rollers 5, 6 and 7 thereby causing the belt to move in the direction as indicated by the arrow. A light source 11 and reflector 12 are disposed within a drum 10 which is rotated in the direction indicated by the arrow in synchronism with the belt 8. A microswitch 17 is actuated by the original as it leaves the machine to thereby reset a counter as is described below.

In operation, a main switch (not shown) of the motor 9 is closed so that the motor 9 rotates at a predetermined "normal" speed. The original *a* is then inserted between the guides 1 and 2 while the photo-sensitive paper *b* enters along guide 3. The intensity of light from the lamp 13 received by photoelectric element 14 varies depending upon the light penetrating coefficient or light transmittance of the original *a*. More specifically, when the pentrating coefficient of the original *a* is low, the quantity of light intercepted by the photoelectric element 14 is decreased so that its resistance is increased. On the other hand, when the penetrating coefficient of the original *a* is higher, the quantity of light intercepted by the element 14 is increased so that its resistance is reduced.

In response to this change in resistance of element 14, the rotational speed of the motor 9 and consequently the speed of the belt 8 is varied as will be later described in more detail with reference to FIGS. 2 and 3. More specifically, when a relatively thick original *a* is fed into the machine the resistance of element 14 is correspondingly increased and the speed of the belt 8 is decreased accordingly to increase the exposure time. That is the original *a* (in registration with the photo-sensitive paper *b*) is transported between the drum 10 and the belt 8 and the photo-sensitive paper *b* is exposed by lamp 11. Thus, since original *a* has a relatively low light penetrating coefficient, the speed of the belt 8 is correspondingly decreased to increase exposure time. Consequently, the low light penetrating coefficient of the original *a* is compensated for by increasing the exposure time and thus keeping the quantity of light reaching the photo-sensitive paper at a relatively constant optimum value.

On the other hand, if a relatively thin original a having a high light penetrating coefficient is fed into the machine, the speed of the conveyor belt 8 is automatically increased to reduce the exposure time. Consequently, the high light penetrating coefficient of the original is compensated by the shorter exposure time.

Figure 2:
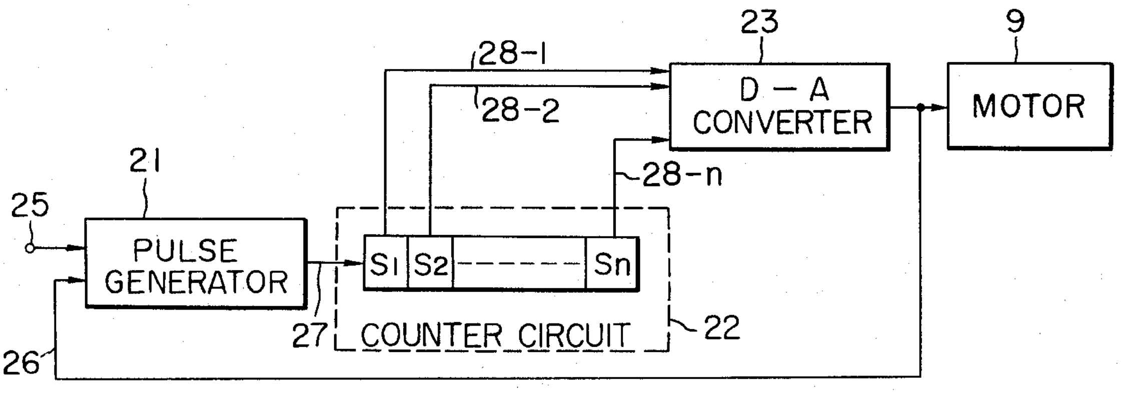
FIG. 2 is a block diagram of an automatic exposure control device in accordance with this invention.

FIG. 2 shows a block diagram of an automatic time exposure control device in accordance with this invention. A pulse generator 21 generates a pulse at an output terminal 27 when there is a difference in voltages applied to input terminals 25 and 26, but will not generate a pulse when the voltages at the input terminals 25 and 26 are the same.

These output pulses from pulse generator 21 are then counted by a binary counter 22 which holds or stores the contents as counted after counting the last pulse. An analog voltage having a magnitude corresponding to the contents of binary counter 22 is produced by a digital-to-analog converter 23, and this exposure control signal is then applied to control the speed of motor 9. This exposure control voltage is also fed back to input terminal 26 of pulse generator 21 while a voltage having a magnitude corresponding to the variation in resistance of photoelectric element 14 (See FIG. 1) is applied to the other input terminal 25. Thus pulse generator 21 will continue to produce pulses on line 27 until this feed back voltage magnitude matches the voltage input on terminal 25. Of course, other values than equality could also be used to stop pulse generator 21 as will be appreciated by those skilled in the art.

When an original having a low light penetrating coefficient is fed into the machine, the resistance of the photoelectric effect element 14 is increased and the voltage applied to terminal 25 is increased accordingly. In consequence, there occurs a difference between the voltages at the input terminals 25 and 26 so that pulses are generated on line 27 and transmitted to binary counter 22 capable of storing *n* digits in the stages $S_1 - S_n$.

The digital outputs of the binary counter 22 are applied to the D–A converter 23 through lines 28–1 to **28–*n* so that an analog voltage proportional to the contents of counter 22 is fed back to the input terminal 26. When this feed back voltage reaches a point of coincidence with the voltage applied to input terminal 25, the pulse generator 21 is deactivated so that no additional pulses are thereafter generated on line 27 and counter 22** stops counting, but holds its contents as previously counted.

The exposure control signal or voltage applied to the motor 9 from D–A converter 23 is therefore dependent upon the total count of pulses by binary counter 22 and the rotational speed of motor 9 is thus dependent upon this voltage also. Consequently the speed of conveyor belt 8 is varied in dependence upon the light penetrating coefficient or transmittance of the original *a* so that the photo-sensitive paper *b* is always automatically subjected to an optimum exposure of light. Upon completion of the exposure of an original, microswitch 17 is actuated by the original *a* as it leaves the machine thereby producing a resetting signal for counter 22 to reset its contents to a value corresponding to a "normal" motor speed in anticipation of repeating the automatic exposure control cycle with the next original form.

Figure 3:
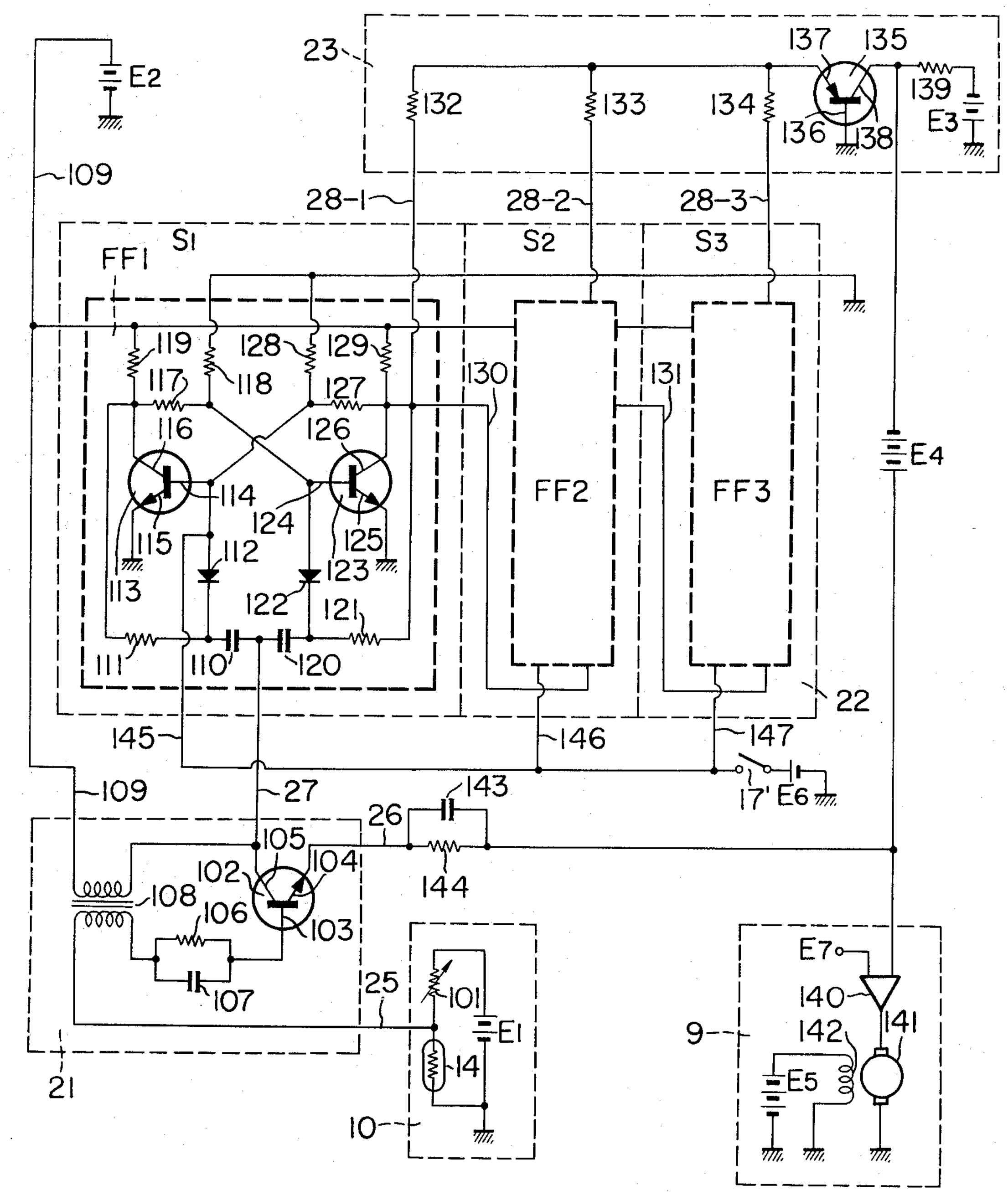
FIG. 3 is a detailed circuit diagram of the device shown in FIG. 2.

FIG. 3 is a detailed circuit diagram of the automatic exposure time control device shown in FIG. 2 with the parts described within FIGS. 1 and 2 being designated by the same reference numerals. More particularly, there are shown the motor drive circuit 9; the light penetrating coefficient detecting circuit 10; the pulse generating circuit 21, the counter circuit 22 and the digital-to-analog converter circuit 23.

The motor drive circuit 9 comprises a differential amplifier 140, a motor armature 141 and an armature excitation coil 142. When the switch (not shown) of the power source of the motor drive circuit 9 is closed (before inserting an original) the armature 141 rotates at a rated speed substantially in proportion to a voltage of $E_7 - (E_4 - E_3)$ because the resistance between the emitter 137 and the collector 138 of a transistor 135 is very high.

The light penetrating coefficient detecting circuit 10 comprises a power source $E_1$ and a potentiometer consisting of a variable resistor 101 and a photoelectric element 14 described with reference to FIG. 1. The output of the detecting circuit 10 appears on the line 25. As seen in FIG. 3, when there is no original inserted in the machine, the intensity of light from the lamp 13 (See FIG. 1) intercepted by the photoelectric element 14 is at a maximum so that the resistance of element 14 is at a minimum. In consequence, the voltage on the line 25 is also at a minimum value. The voltage on line 25 is then increased as the light penetrating coefficient of the original is decreased and in dependence thereon.

Pulse generator 21 comprises a transistor 102, a transformer 108 for feeding back the signal from collector 105 of transistor 102 to its base terminal 103 through a coupling resistor 106 and capacitor 107. The output voltage of the detecting circuit 10 is applied to the base 103 of the transistor 102 through the line 25, the transformer 108, the coupling resistor 106 and capacitor 107. Pulses generated by the pulse generator 21 are transmitted through line 27 to the binary counter 22. The parameter values are chosen such that when an original is not inserted, the voltage at the terminal 25 is equal to that applied to terminal 26 thus inactivating transistor 102 so that no pulses are generated. On the other hand, when an original is inserted, the voltage at the terminal 25 is increased, the transistor 102 is rendered conductive and pulses are thus generating at the output terminal 27.

Binary counter 22 consists of three stages $S_1$, $S_2$ and $S_3$ so that it may count from 000 to 111. It should be noted that only three stages are shown in this exemplary embodiment for simplicity of description; however, any number of stages may be used as will be appreciated by those in the art.

The stages $S_1 - S_3$ comprise flip-flops $FF_1$, $FF_2$ and $FF_3$ of which only $FF_1$ is depicted in detail because the constructions in all flip-flops are all identical. The positive terminal of a power source $E_2$ is connected to the collector 116 of a transistor 113 through a line 109 and resistor 119, and to the collector 126 of a transistor 123 through the line 109 and resistor 129. The emitters 115 and 125 of transistors 113 and 123 are grounded. The base 114 of the transistor 113 is coupled to the collector 126 of the transistor 123 through a resistor 127 and is grounded through a resistor 128. The base 124 of the transistor 123 is coupled to the collector 116 of the transistor 113 through a resistor 117 and is grouneded through a resistor 118. The output terminal 27 of the pulse generator 21 is connected to the bases 114 and 124 of the transistors 113 and 123 through capacitors 110 and 120, and diodes 112 and 122. The bases 114 and 124 are also connected through contact 17' of the switch 17 (See FIG. 1) to the power source $E_6$. The shift pulse is transmitted through the line 130 to the next stage $FF_3$. The shift pulse of the stage $FF_2$ is transmitted through the line 131 to the next stage $FF_3$. Before an original is inserted, the left hand transistors in each of the flip-flops $FF_1$–$FF_3$ are set "on" by a reset pulse from the power source $E_6$. This corresponds to a "normal" counter contents producing low outputs on lines 28–1 to 28–3 which, in turn, cause a so called "-normal" motor speed.

The digital-to-analog converter 23 comprises a transistor 135 whose emitter 137 is connected to the output terminals 28–1, 28–2 and 28–3 of the flip-flops $FF_1$-$FF_3$ through resistors 132, 133 and 134 which are weighted for example in such a manner that the value of the resistor 132 is R ohms, that of the resistor 133, R/2 and that of the resistor 134, R/4. The base 136 is grounded while the collector 138 is connected to the power source $E_3$ through a resistor 139. When an original is absent, the current flowing in the emitter 137 is so small that the voltage at the collector 138 connected to the power source $E_4$ is approximately $-E_3$ volts. The voltage at the collector 138 is then fed back through power sources $E_4$ and a coupling unit 143 and 144 to input 26 of pulse generator 21.

When the power source switch (not shown) of the motor drive circuit 9 is closed before the original is inserted, the armature 141 of the motor 9 rotates at a rated speed in proportion to $E_7$–($E_4$–$E_3$) as discussed hereinabove. In this case the voltage at the input terminal 25 of the pulse generator 21 is equal to that at the terminal 26 so that the transistor 102 is non-conducting. Therefore, no pulses are generated. As described above, the left Transistor in each of the flip-flops $FF_1$-$FF_3$ are conducting so that very small current flows into the emitter 137 of the transistor 135 through the terminals or lines 28–1 - 28–3 and resistors 132 - 134. Thus, the signal voltage at the collector 138 of the transistor 135 is $-E_3$ volt.

When an original with a low light penetrating coefficient is inserted into the photocopying device, the resistance of the photoelectric element 14 in the detecting circuit 10 is increased so that the voltage at the terminal 25 is likewise increased. Consequently, the transistor 102 is rendered conductive and a pulse is generated and transmitted to the base 124 of the transistor 123 so that the voltage at the base 124 becomes higher than that at the emitter 125. In consequence, the transistor 123 is rendered conductive while the transistor 113 is rendered non-conductive. In a similar manner, the next pulse causes the transistor 113 to conduct and the transistor 123 to cut off. In this case, the shift pulse is supplied to the next flip-flop $FF_2$ so that the latter is reversed.

Thus, the pulses from the pulse generator are counted by counter 22. When each pulse is received by the counter 22, that is, as contents in the counter 22 is being counted up, the current flowing into the emitter 137 of the transistor 135 through the lines 28–1, 28–2 and 28–3 and resistors 132, 133 and 134 is being increased, so that the voltage across the resistor 139 is also increased. Consequently, the feedback voltage to the input terminal 26 of the pulse generator 21 is increased and when this feedback voltage on line 26 reaches a value equal to that of the voltage at the input terminal 25, the transistor 102 in the pulse generator is cut off so that no more pulses are generated. At this point, counter 23 stops counting and maintains its contents the same as after the last pulse was received. That is, the contents in the binary counter 23 is in reverse proportion to the light penetrating coefficient of the original so that the voltage across the resistor 139 is increased in proportion to the light penetrating coefficient of the original.

When an original with a low light transmittance is inserted, the voltage across the resistor 139 in the D-A converter 23 is increased so that the input voltage to difference amplifier 140, that is, $E_7 - (E_4 - E_3 +$ voltage drop across the resistor 139) is decreased. Consequently, the rotational speed of the armature 141 is decreased below its rated speed so that the time of the original *a* and the photosensitive paper *b* are transported by the belt 8 is increased, thus increasing the exposure time by the required amount.

Upon completion of an exposure of an original, the original actuates a limit switch 17 (See FIG. 1) so that its contact 17' is closed as the original leaves the machine. Now the reset pulse is applied to the flip-flops $FF_1$, $FF_2$ and $FF_3$ through the lines 145, 146 and 147 so that the counter 22 is reset and the motor 9 again rotates at its rated speed until the next original is inserted.

Although this invention has only been described with particular reference to one exemplary emobodiment, it should be understood that variations and modifications obvious to those skilled in the art can be effected without departing the true spirit of the present invention and accordingly all such modifications and variations are intended to be included within the scope of this invention.

What is claimed is:

1. A contact exposure type photocopying machine for copying an original onto photo-sensitive copy paper, said machine comprising:

light exposure means, transport means for transporting said original in registration with said photo-sensitive paper through said exposure means at a controllable speed, light penetrating coefficient detecting means for generating an analog electrical signal related to the light penetrating coefficient of said original, pulse generating means actuable by said analog electrical signal for generating a number of pulses representative of said analog electrical signal, digital counter means actuable by said pulses for counting said pulses and producing a digital output in response thereto, digital-to-analog converter means for converting said digital output of said counter means into a control output analog electrical signal, means for applying said control output of said digital-to-analog converter means to transport means for automatically controlling said controllable speed of said transport means, reset means for resetting said counter to a preset count, wherein said preset count represents a normal speed for said transport means, and further including switch means actuable by said original upon completion of exposure disposed in the vicinity of said transport means for producing a reset signal for said counter.

2. An improvement as in claim 1 wherein said pulse generator means is operatively connected to said detecting means and to said converter means and wherein said pulse generator includes means for producing said pulse only when said signal representing the light intensity is greater than said analog exposure signal.

3. A contact photocopying machine as defined in claim 1 wherein:

said light penetrating coefficient detecting means includes a photoelectric element having an electrical resistance varied in response to the light transmittance of said original.

4. Apparatus as set forth in claim 1 wherein said switch means comprises a microswitch said microswitch being actuated as said original leaves the machine.

5. An improvement as in claim 1 wherein said transport means further comprises:

speed control means operatively connected to said converter means for varying the speed of transporting said original and said copy paper past a light exposure device in said machine.

6. A contact photocopying machine as in claim 1 including:

means for energizing said pulse generating means when said analog electrical signal of said penetrating coefficient detecting means is not in coincidence with said control output of said digital-to-analog converter means, and means for de-energizing said pulse generating means when both said analog electrical signal and said control output coincide with each other 7. A contact photocopying machine as defined in claim 1 wherein:

said counter means comprises a binary counter.

* * * * *